Aug. 16, 1960 — L. D. DUNN — 2,949,525
COOKER
Filed May 21, 1958 — 2 Sheets-Sheet 1
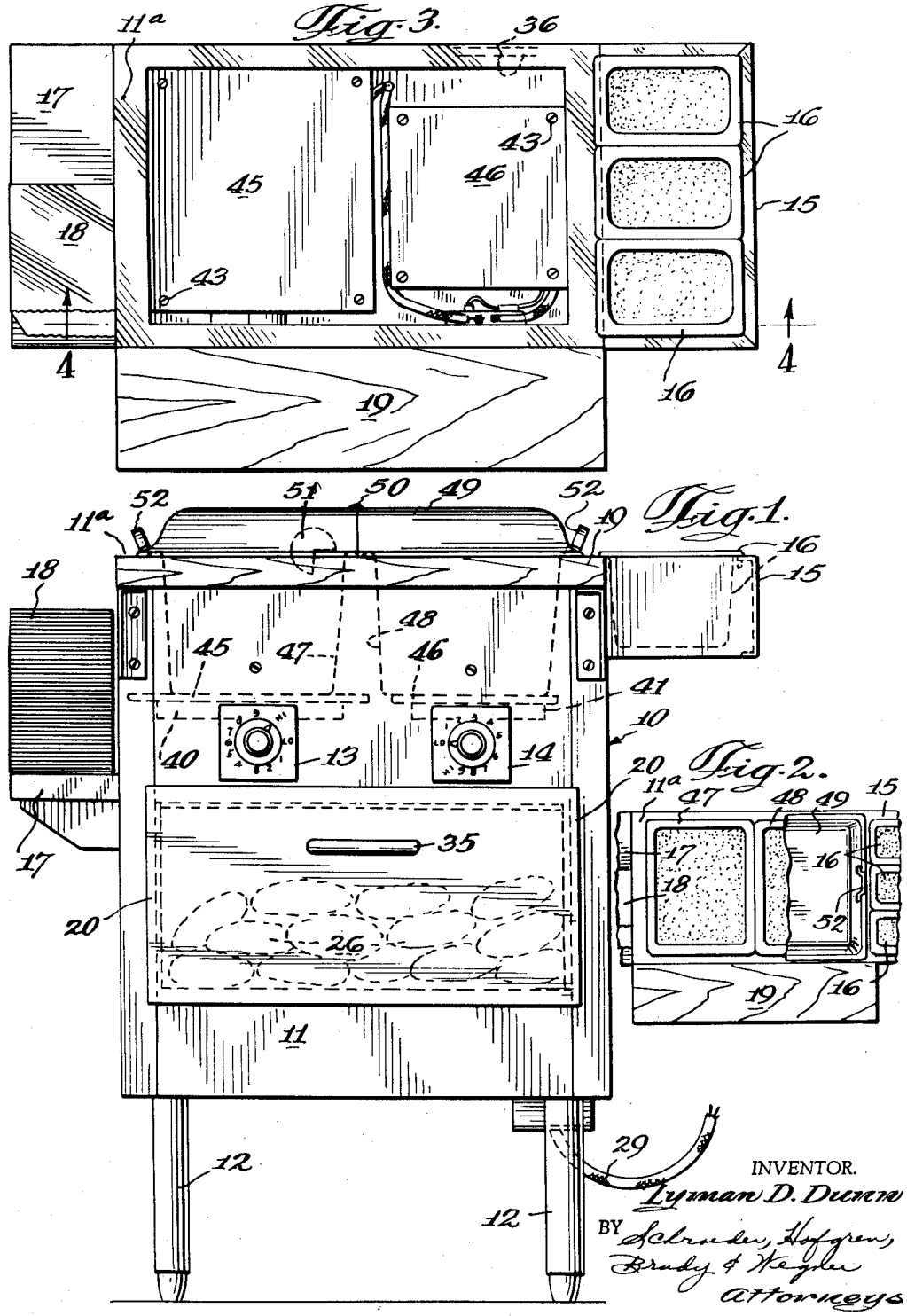

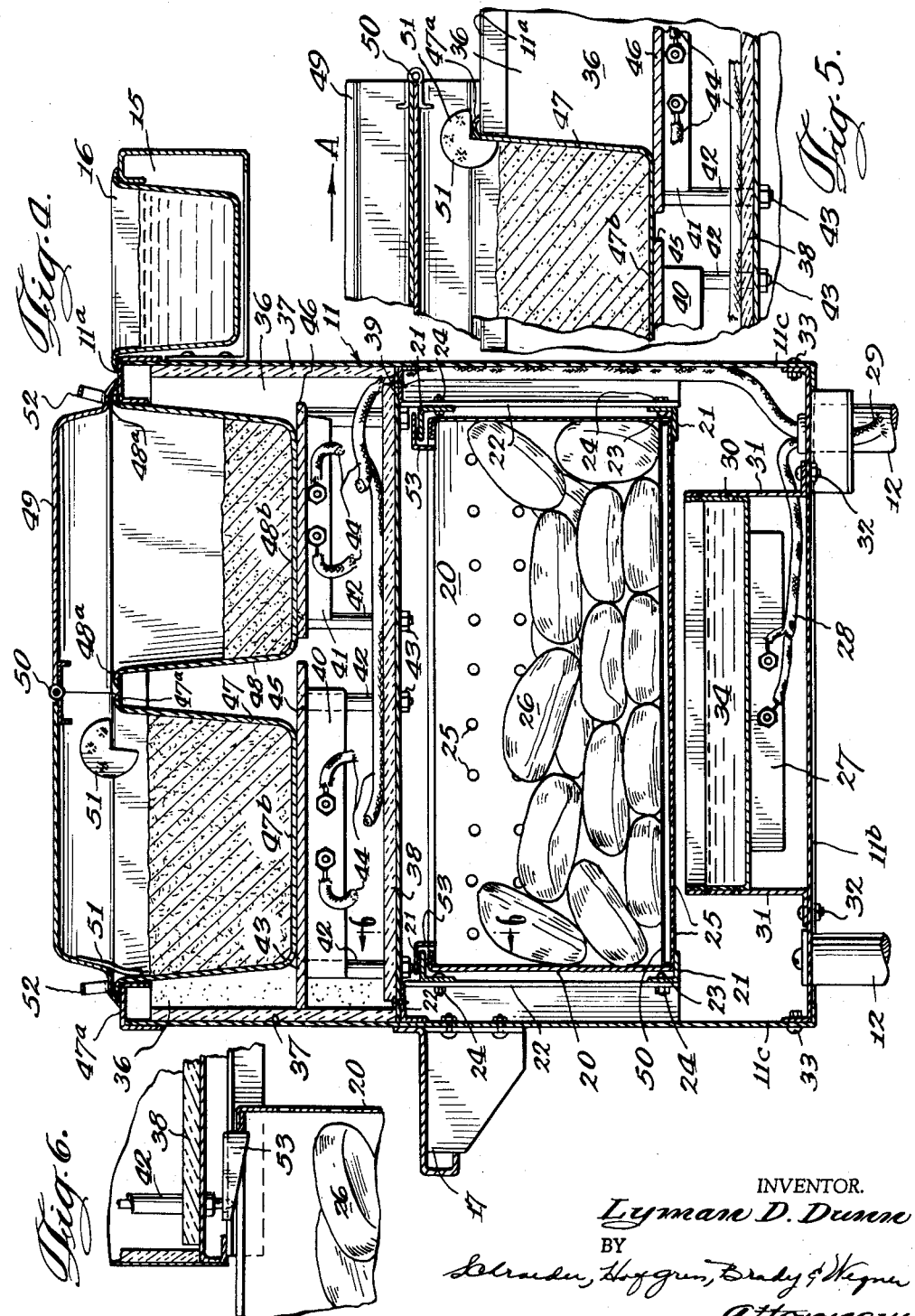

United States Patent Office 2,949,525
Patented Aug. 16, 1960

2,949,525
COOKER
Lyman D. Dunn, 2555 South Parkway, Chicago 16, Ill.
Filed May 21, 1958, Ser. No. 736,875
4 Claims. (Cl. 219—35)

This invention relates to a cooking device and more particularly to a cooking and serving device adapted for efficient one man operation.

Ice cream stands and the like are frequently found along the highways and in the amusement areas of this country. The majority of these stands also offer sandwiches and the like, such as hamburger, barbecued beef, etc. The stands are commonly operated by one man and during heavy business periods, the cooking and serving of sandwiches is often difficult.

It is, therefore, an object of this invention to provide a very efficient and time-saving cooking and serving device which can be operated by one man to simultaneously cook meat, keep cooked meat warm and to easily transfer cooked meat from the cooking area to the warming area all with a minimum of motion.

It is a further object of this invention to provide a cooking and serving device for use by a purveyor which comprises a cooking and warming compartment, a plurality of heating units in the compartment, the surfaces of the heating units being substantially flat and coplanar, a food container arranged to fit in the compartment and to rest on one of the heating units, and means for slidably transferring the container from one of the heating units to another heating unit.

Other objects and advantages of the invention will become apparent from the following description taken together with the accompanying drawings.

Of the drawings:

Figure 1 is a front elevational view of the cooking and serving device of this invention showing some of the interior construction in dotted lines;

Figure 2 is a reduced fragmentary top plan view partially broken away;

Figure 3 is a top plan view with the cover and containers removed;

Figure 4 is an enlarged fragmentary sectional view taken substantially along the line 4—4 of Figure 3 but with the cover and containers in place;

Figure 5 is an enlarged fragmentary sectional view of a portion of a container and the cover, with the cover folded back as the container is moved from one heating unit to another; and Figure 6 is an enlarged sectional view taken substantially along line 6—6 of Figure 4.

The cooking and serving device 10 of this invention includes an outer cabinet 11 which is constructed of sheet metal material. The cabinet 11 is supported by legs 12 so that the top working portion 11a is located at a height convenient to the operator. A pair of heating controls 13 and 14 are positioned on the front of the cabinet 11. These heating controls are used to adjust the heat level of the heating units which will be explained later.

Attached to the outer cabinet 11 are a number of working surfaces. Among these is a condiment container 15 which contains a plurality of trays 16. These trays are designed to contain such things as mustard, catsup, and the like. On the opposite side of the cabinet 11 is located a bag shelf 17. Thus a box 18 containing sandwich bags and the like, may be located here to provide easy access for the server. A wooden work space 19 is attached to the front of the cabinet to provide the operator a space on which to assemble the sandwiches.

The lower portion of the cooking and serving device is devoted to preparation and storage of the hamburger buns and the like which will be used in making the sandwiches. A bun drawer 20 is slidably positioned in the cabinet 11 by means of four guiding L-shaped angle irons 21. These angle irons 21 are attached to support members 22 by bolts 23 and nuts 24. A pair of spring stops 53 shown in Figure 6 prevents the drawer from being pulled all the way out. The walls and bottom of the bun drawer 20 contain a plurality of perforations 25. These perforations allow the warmed humid air which will be described next, to heat the hamburger buns 26. A removable perforate screen 50, which allows warm air to reach the bottom layer of buns, is seated about one-half inch from the bottom of the drawer 20. A conventional handle 35 is provided on the outer surface of the drawer for opening and closing the same.

Positioned below the bun drawer 20 is an automatic electrical heating unit 27 of conventional design. The electrical leads 28 connected to the main electrical power lead 29 provide the electrical power. Positioned above the heating unit 27 in heat transfer relationship therewith is a water pan 30. This pan is welded to a pair of supports 31 which are bolted 32 to the floor 11b of the cabinet 11. The floor 11b is bolted 33 to the side walls 11c. A quantity of water 34 is placed in the pan 30 and when heated it provides moisture for the buns 26. Thus a warm humid atmosphere is provided in the bun drawer by means of an automatic thermostat (not shown) which controls the temperature of the heating unit 27.

A cooking and warming compartment 36 is provided in the top portion 11a of the cabinet. This cooking and warming compartment is surrounded by insulated walls 37 and is provided with a metal bottom 38. The metal bottom, which is fastened to the support members 22 by rivets 39, supports a pair of electrical heating units 40 and 41. These units are supported by legs 42 which are bolted 43 to the bottom 38. The units take their electrical power from the main lead 29 through the leads 44 which are only partially shown. The heating units are of a conventional type and are connected to the heating controls 13 and 14 located on the front of the cabinet 11. The heating unit 40 is capable of a higher temperature than the heating unit 41 so that the heating unit 40 may act as a cooking and warming unit while the heating unit 41 is designed to operate only as a warming unit. The heating controls 13 and 14 may be adjusted to provide the desired temperatures.

A pair of metal plates 45 and 46 are located in heat transfer relationship over the heating units 40 and 41. They are held in this position by the bolts 43 which pass through holes in their surface. These metal plates 45 and 46 are positioned substantially coplanar and have a substantially smooth upper surface.

A pair of containers 47 and 48 constructed of metal or some similar material are set in the cooking and warming compartment 36. These containers are designed to hold the sandwich meat during cooking and while it is kept warm. In Figures 4 and 5, a quantity of meat product is shown in the containers. The containers 47 and 48 are provided with outwardly extending lips 47a and 48a which extend around the entire periphery of the pan. These lips are designed to extend over the surface 11a of the cabinet. The bottoms of the containers 47b and 48b rest on the plates 45 and 46 in a heat transfer relationship. Since the plates 45 and 46 are smooth and coplanar, it is also possible to slide the containers 47 and 48 from one heating unit to another as is shown in Figure 5.

An elongated cover 49 for the containers 47 and 48, is hinged 50 at its middle so that it may be tilted back upon itself to uncover one of the containers. Welded to one side of the interior of the cover 49 are a plurality of tabs 51. The tabs are designed to provide a frictional grip between themselves and the inner surface of the pans 47 and 48. Thus as is shown in Figure 4 when the cover 49 is placed in position over the pans 47 and 48, the tabs 51 will frictionally grip the pan 47 so as to provide a substantially tight connection. However, the right hand portion of the cover 49 is only resting upon the pan 48. The cover 49 is also provided with a pair of handles 52 for raising and lowering the sides of the cover.

In using the cooking and serving device 10 of this invention, the operator may very efficiently produce meat sandwiches. The operator stands in front of the cabinet 11 and tilts back the right hand portion of the cover 49 to uncover the pan 48. He opens the drawer 20 and removes a bun 26 with his left hand, inserts the meat from the pan 48 into the bun with his right hand, adds condiments from the pan 16 with his right hand, removes a bag from the box 18 with his left hand and inserts the sandwich therein with his right hand. These are all smooth natural movements thus saving important time. While using the warmed meat in the pan 48 which is positioned over the warming unit 41, the meat in the pan 47 is cooked by the cooking unit 40. After the cooking is complete, the cooking unit 40 is turned to the warming position on the control 13. When the pan 48 is empty, it is simply removed from its position in the cooking and warming compartment 36 at which point the operator places his hand on the handles 52 of the cover 49 which is bent back upon itself and applying a force in the direction shown by the arrow A in Figure 5 slides the pan 47 across to the warming position. This operation is done very quickly and smoothly without any danger of burning the operator's hand. A new pan full of uncooked meat is inserted on the plate 45 of the unit 40 and the cover 49 is simply lifted up and transferred into position on the new pan. The operator may thus serve sandwiches with but little break in his motion for transfer of pans.

Having described my invention as related to the embodiments set out herein, it is my intention that the invention be not limited by any of the details of description, unless otherwise specified, but rather be construed broadly within its spirit and scope as set out in the accompanying claims.

I claim:

1. A cooking and serving device for use by a purveyor comprising: a cooking and warming compartment adapted to receive a plurality of food containers; a plurality of heating units in said compartment, the surfaces of said heating units being substantially flat and coplanar; a food container arranged to fit in a portion of said compartment and to rest on one of said heating units; and means for at least two of said plurality of containers including a cover for slidably transferring said container from one heating unit to another heating unit.

2. A cooking and serving device for use by a purveyor comprising: a cooking and warming compartment having side and bottom walls; a plurality of heating units positioned adjacent the bottom wall of said compartment, the surfaces of said heating units being substantially flat and coplanar; a plurality of food containers arranged to fit relatively snugly in said compartment and to rest on said heating units; and means including a cover for said containers for transferring one of said containers from one heating unit to another heating unit after the removal of another of said containers.

3. A cooking and serving device for use by a purveyor comprising: a cooking and warming compartment having side and bottom walls; a pair of heating units positioned adjacent the bottom wall of said compartment, the surfaces of said heating units being substantially flat and coplanar; a pair of food containers arranged to fit relatively snugly in said compartment and to rest on said heating units; and a cover for said containers, one portion of said cover arranged to be frictionally attached to the first of said containers and the other portion of said cover arranged to cover the second of said containers and to act as a handle for transferring the first of said containers from one heating unit to the other heating units after the removal of the second of said containers.

4. A cooking and serving device for use by a purveyor comprising: a cooking and warming compartment having side and bottom walls; a pair of heating units in said compartment; a pair of flat metal plates positioned in a substantially horizontal, coplanar heat transfer relationship over said units; a pair of food containers having substantially flat bottoms arranged to fit relatively snugly in said compartment with said bottoms resting on said metal plates; and a cover for said containers having two portions, the first of said portions being arranged to cover the first of said containers and having a plurality of extending tabs for gripping said first container, the second of said portions being hingedly attached to said first portion and arranged to cover the second container, and said second portion when folded back on said first portion also arranged to cooperate with said first portion to act as a handle for transferring the first of said containers from one heating unit to the other after the removal of said second containers.

References Cited in the file of this patent

UNITED STATES PATENTS

| 1,919,950 | Kerr | July 25, 1933 |
| 1,936,215 | Speaker | Nov. 21, 1933 |
| 2,840,436 | Mason | June 24, 1958 |

FOREIGN PATENTS

| 801,533 | Germany | Jan. 11, 1951 |